United States Patent
Sasaki et al.

(10) Patent No.: US 8,599,333 B2
(45) Date of Patent: Dec. 3, 2013

(54) CIRCUIT AND METHOD FOR DRIVING LED STRING FOR BACKLIGHT, AND BACKLIGHT AND DISPLAY DEVICE USING THE CIRCUIT

(75) Inventors: Yoshikazu Sasaki, Kyoto (JP); Kenichi Fukumoto, Kyoto (JP)

(73) Assignee: Rohm Co., Ltd. (JP)

( * ) Notice: Subject to any disclaimer, the term of this patent is extended or adjusted under 35 U.S.C. 154(b) by 0 days.

(21) Appl. No.: 13/505,906

(22) PCT Filed: Nov. 2, 2010

(86) PCT No.: PCT/JP2010/006464
§ 371 (c)(1), (2), (4) Date: Jul. 12, 2012

(87) PCT Pub. No.: WO2011/055533
PCT Pub. Date: May 12, 2011

(65) Prior Publication Data
US 2012/0274877 A1    Nov. 1, 2012

(30) Foreign Application Priority Data
Nov. 4, 2009 (JP) .................................. 2009-252861

(51) Int. Cl.
*H05B 37/02* (2006.01)
*G02F 1/13357* (2006.01)

(52) U.S. Cl.
USPC ............................................. 349/69; 315/186

(58) Field of Classification Search
None
See application file for complete search history.

(56) References Cited

U.S. PATENT DOCUMENTS

2008/0164826 A1*  7/2008  Lys ............................... 315/250

FOREIGN PATENT DOCUMENTS

| JP | 2002-252971 A | 9/2002 |
| JP | 2004-32875 A | 1/2004 |
| JP | 2006-49445 A | 2/2006 |
| JP | 2007-28784 A | 2/2007 |
| JP | 2007-173813 A | 7/2007 |
| JP | 2009-16280 A | 1/2009 |

OTHER PUBLICATIONS

International Preliminary Report on Patentability for International Application No. PCT/JP2010/006464, issued Jun. 12, 2012.
International Search Report for International Application No. PCT/JP2010/006464, mailed Jan. 25, 2011, with English translation.

* cited by examiner

*Primary Examiner* — Crystal L Hammond
(74) *Attorney, Agent, or Firm* — Cantor Colburn LLP

(57) ABSTRACT

An LED driving circuit drives a display backlight LED string including multiple LEDs connected in series. A power supply supplies a driving voltage from an output terminal thereof to a first end of the LED string. A detection resistor is arranged between a second end of the LED string and a fixed voltage terminal. The LED driving circuit receives a pulse modulation signal having a duty ratio that corresponds to the luminance. In the on period, in which the PDIM signal is the first level, the LED driving circuit controls the power supply such that the voltage drop across the detection resistor approaches a predetermined target value. In the off period, in which the PDIM signal is the second level, the LED driving circuit stops the control operation for the power supply.

11 Claims, 10 Drawing Sheets

30a

US 8,599,333 B2

CIRCUIT AND METHOD FOR DRIVING LED STRING FOR BACKLIGHT, AND BACKLIGHT AND DISPLAY DEVICE USING THE CIRCUIT

CROSS REFERENCE TO RELATED APPLICATIONS

This is a U.S. national stage of application No. PCT/JP2010/006464, filed on 2 Nov. 2010. Priority under 35 U.S.C. §119(a) and 35 U.S.C. §365(b) is claimed from Japanese Application No. 2009-252861, filed 4 Nov. 2009, the disclosure of which are also incorporated herein by reference.

BACKGROUND OF THE INVENTION

1. Field of the Invention

The present invention relates to a driving technique for a light emitting diode.

2. Description of the Related Art

As a backlight for a liquid crystal panel, white light emitting diodes (which will be simply referred to as "LEDs" hereafter) having improved properties from the perspective of a long operating life, low power consumption, and a wide color range are employed instead of conventional CCFLs (Cold Cathode Fluorescent Lamps) or EEFLs (External Electrode Fluorescent Lamps).

RELATED ART DOCUMENTS

Patent Documents

[Patent Document 1]
  Japanese Patent Application Laid Open No. 2004-32875
[Patent Document 2]
  Japanese Patent Application Laid Open No. 2002-252971
[Patent Document 3]
  Japanese Patent Application Laid Open No. 2007-028784
[Patent Document 4]
  Japanese Patent Application Laid Open No. 2007-173813

The luminance of a backlight is controlled by performing high-speed switching of a current to be applied to an LED according to a PWM (Pulse Width Modulation) signal so as to repeatedly blink (turn on and off) the LED. That is to say, as the duty ratio of the PWM signal becomes higher, the luminance becomes higher, and as the duty ratio becomes lower, the luminance becomes lower. Such a method is referred to as the "PWM dimming control method".

With such a PWM dimming control method, a constant current circuit is arranged on a driving path of multiple LEDs connected in series (which will be referred to as an "LED string" hereafter), and an operation is performed for switching a driving current generated by the constant current circuit according to the PWM signal, thereby providing a PWM dimming control operation.

The present applicant has come to recognize the following problem. That is to say, in a case in which a low frequency on the order of 100 Hz to 500 Hz is selected as the frequency of the PWM signal, such a frequency is in the vicinity of the scanning frequency of the liquid crystal panel. Accordingly, the blinking of the LED string, which is involved in the PWM dimming control operation, leads to screen flicker.

In order to solve such a problem, the frequency of the PWM signal should be raised to a high frequency at which the blinking of the LED string becomes imperceptible as screen flicker, specifically, to a frequency on the order of 10 kHz to 50 kHz, for example. However, such an arrangement requires a high performance (low output impedance) power supply configured to supply a driving voltage to the LED string. In a case in which a switching regulator is employed as such a power supply, there is a need to raise the switching frequency thereof, which becomes a severe constraint on the design. Specifically, examples of such design constraints include: (i) constraints due to coil thermal capacitance; (ii) lowered efficiency due to an increased switching frequency; (ii) constraints with respect to the ranges of the input voltage and the output voltage.

SUMMARY OF THE INVENTION

The present invention has been made in view of such a situation. Accordingly, it is an exemplary purpose of an embodiment of the present invention to provide a driving technique for a backlight LED which is capable of suppressing screen flicker.

An embodiment of the present invention relates to a driving circuit configured to drive a display backlight LED string comprising multiple LEDs connected in series. The driving circuit comprises: a power supply configured to supply a driving voltage from an output terminal thereof to a first end of the LED string, and comprising an output capacitor arranged between an output terminal thereof and a fixed voltage terminal; a detection resistor arranged between a second end of the LED string and a fixed voltage terminal; and a control unit configured to receive a pulse modulation signal having a duty ratio that corresponds to a luminance, to control the power supply in an on period in which the pulse modulation signal is a first level such that the voltage drop across the detection resistor approaches a predetermined target value, and to stop the control operation for the power supply in an off period in which the pulse modulation signal is a second level that differs from the first level.

With such an embodiment, in the on period, a normal driving voltage is supplied to the LED string, and thus, a driving current that corresponds to the luminance flows through the LED string. When the period switches to the off period, the control operation for the power supply is stopped. In this state, the supply of charge from the power supply to the output capacitor is stopped. As a result, the charge stored in the output capacitor is discharged to the fixed voltage terminal via the LED string and the detection resistor. Thus, the driving voltage gradually falls over time. As a result, the LED string gradually transits from a state in which it emits light to a state in which it does not emit light. With such a driving circuit according to the embodiment, such an arrangement is capable of preventing the current that flows through the LED string from suddenly falling in the PWM dimming control operation, in which the period is alternately switched between the on period and the off period. Thus, such an arrangement is capable of suppressing screen flicker that occurs due to the PWM dimming control operation.

Also, the power supply may be configured as a switching regulator comprising a switching element. Also, the control unit may be configured to stop a switching operation of the switching element in the off period.

Also, the capacitance C of the output capacitor and the resistance value R of the detection resistor may be determined so as to satisfy a relation $2.5\Omega \le R \le 500\Omega$ and $0.01\,\mu F \le V \le f(R)$, wherein the line that represents the aforementioned function $f(R)$ passes through a coordinate point ($R=2.5\Omega$ and $C=100\,\mu F$) and a coordinate point ($R=500\Omega$ and $C=1\,\mu F$) when plotted on a double logarithmic graph where the vertical axis represents the capacitance value C, and where the horizontal axis represents the resistance value R. The slope with which (rate at which) the driving voltage falls in the off period is mainly determined by the resistance R of the detection resistor, the impedance Z of the LED string, and the capacitance C of the output capacitor. Thus, by suitably selecting the resistance R and the capacitance C, such an arrangement is capable of appropriately preventing screen flicker.

Another embodiment of the present invention also relates to a driving circuit. The driving circuit comprises: a power supply configured to supply a driving voltage from an output terminal thereof to a first end of the LED string, and comprising an output capacitor arranged between an output terminal thereof and a fixed voltage terminal; a detection resistor arranged between a second end of the LED string and a fixed voltage terminal; a pattern signal generating unit configured to receive a pulse modulation signal having a duty ratio that corresponds to a luminance, and to generate a reference voltage which transits to a first target value with a first slope upon receiving one of a positive edge or a negative edge of the pulse modulation signal, and which transits to a second target value with a second slope upon receiving the other edge of the pulse modulation signal; and a control unit configured to control the power supply such that a voltage drop across the detection resistor approaches the reference voltage.

A driving current that is proportional to the voltage drop across the detection resistor flows through the LED string. Thus, with such an embodiment, by controlling the waveform of the voltage drop across the detection resistor, such an arrangement is capable of dulling the waveform of the driving current, thereby preventing screen flicker.

Yet another embodiment of the present invention also relates to a driving circuit. The driving circuit comprises a switching unit configured to perform switching of a current that flows through the LED string with a duty ratio that corresponds to a luminance. The switching unit is configured to dull at least one from among a positive edge and a negative edge of the waveform of a driving current that flows through the LED string.

With such an embodiment, the driving current for the LED string, i.e., the light-emission luminance, gradually changes, thereby preventing screen flicker that occurs due to the PWM dimming control operation.

Yet another embodiment of the present invention relates to a backlight apparatus. The backlight apparatus comprises: a display backlight LED string comprising multiple LEDs connected in series; and the aforementioned driving circuit configured to drive the LED string.

Yet another embodiment of the present invention relates to a display apparatus. The display apparatus comprises: a liquid crystal display panel; and a backlight apparatus comprising the LED string arranged on the back face of the liquid crystal display panel.

It should be noted that any combination of the aforementioned components may be made, and any component of the present invention or any manifestation thereof may be mutually substituted between a method, apparatus, system, and so forth, which are effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
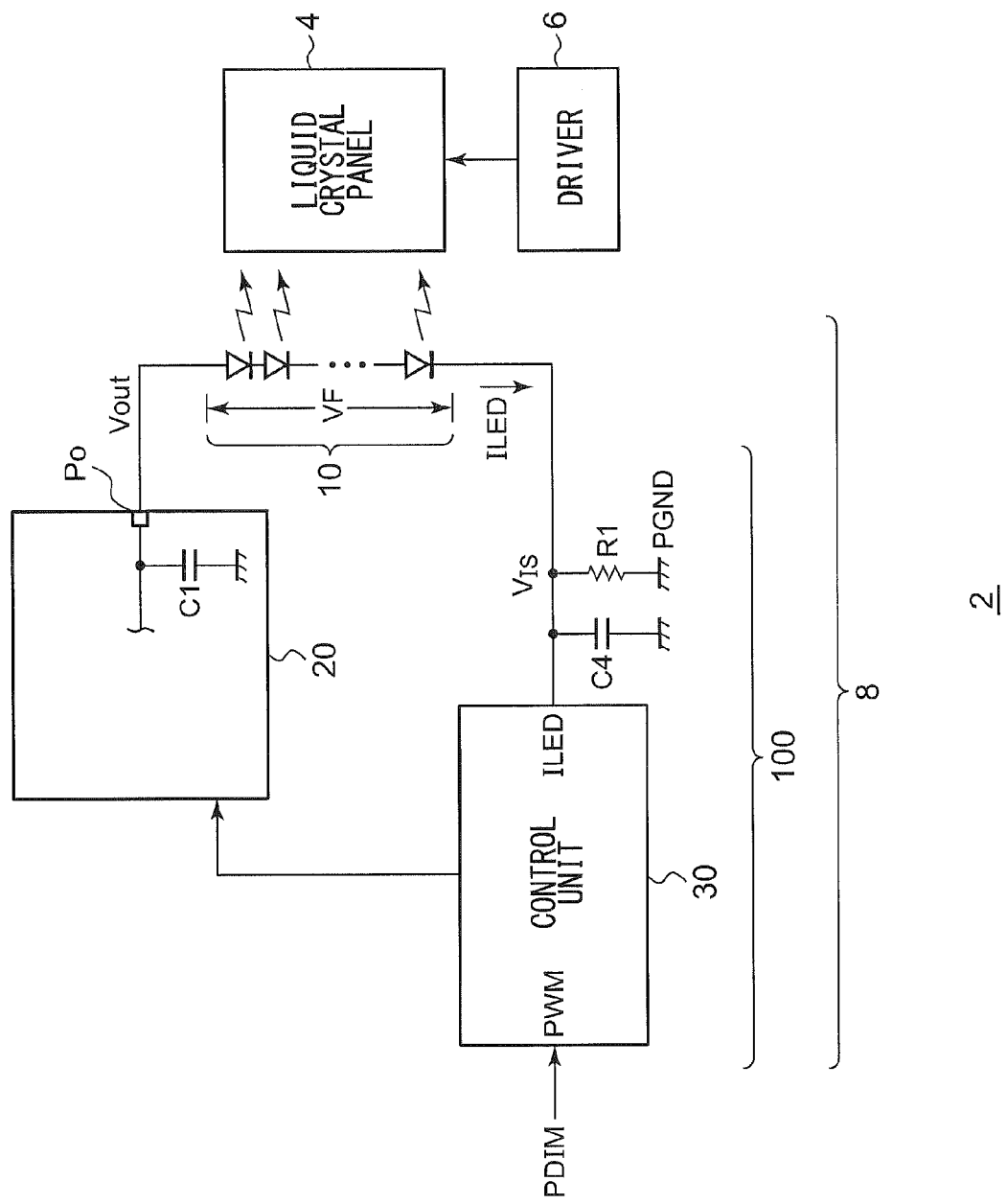
FIG. 1 is a circuit diagram which shows a configuration of a display apparatus according to a first embodiment.

Description will be made below regarding preferred embodiments according to the present invention with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, a state represented by the phrase "the member A is connected to the member B" includes a state in which the member A is indirectly connected to the member B via another member that does not affect the electric connection therebetween, in addition to a state in which the member A is physically and directly connected to the member B.

Similarly, a state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

[First embodiment]

FIG. 1 is a circuit diagram which shows a configuration of a display apparatus 2 according to a first embodiment. The display apparatus 2 includes a liquid crystal panel 4, a liquid crystal driver 6, and a backlight 8.

The liquid crystal panel 4 includes multiple pixels arranged in the form of a matrix. The respective pixels are arranged at the points of intersection of the multiple data lines and the multiple scanning lines. The liquid crystal driver 6 receives image data to be displayed on the liquid crystal panel 4. The liquid crystal driver 6 includes a data driver which applies a driving voltage to the multiple data lines according to the luminance level, and a gate driver which sequentially selects the multiple scanning lines.

The backlight 8 is arranged on the back face of the liquid crystal panel 4. The backlight 8 includes an LED string 10 and a driving circuit 100 configured to drive the LED string 10.

The backlight 8 controls the light-emission luminance of the LED string 10 using two methods, i.e., an analog dimming (current dimming) control method and a PWM dimming control method. With the analog dimming control method, the amount of DC current in the driving current ILED flowing through the LED string 10 is controlled. With the PWM dimming control method, the driving current ILED is switched (on/off) with a duty ratio that corresponds to the luminance, thereby changing the period in which the driving current ILED flows.

In a case in which the switching frequency of the driving current ILED used in the PWM dimming control operation is on the order of 100 to 500 Hz, when a person directly observes the LED string 10, the blinking of the LED string 10 is imperceptible. However, the liquid panel 4 can be regarded as an optical shutter device. Accordingly, in a case in which a person observes the LED string 10 through such a liquid crystal panel 4 that is scanned in synchronization with a particular frame rate, the blinking of the LED string 10 becomes perceptible as screen flicker on the liquid crystal panel 4. The LED driving circuit 100 according to the embodiment is capable of appropriately solving such a problem.

The backlight 8 includes the LED string 10 and the LED driving circuit 100. The LED string 10 includes multiple diodes connected in series. The LED driving circuit 100 supplies a driving voltage Vout to the LED string 10, and controls the current (driving current ILED) that flows through the LED string 10, thereby controlling the luminance of the LED string 10.

The LED driving circuit 100 includes a power supply 20, a detection resistor R1, and a control unit 30.

The power supply 20 supplies the driving voltage Vout via an output terminal Po thereof to a first end of the LED string 10. The power supply 20 includes an output capacitor C1 arranged between the output terminal Po thereof and a fixed voltage terminal (ground terminal). The configuration of the power supply 20 is not restricted in particular. The power supply 20 may be configured as a switching regulator employing a coil or a transformer. Also, the power supply 20 may be configured as a charge pump circuit. Alternatively, the power supply 20 may be configured as a linear regulator. That is to say, such an arrangement may employ any power supply configured such that the output voltage Vout thereof is adjustable by means of a feedback control operation according to the electrical state of the LED string 10 to be driven.

The detection resistor R1 is arranged between a second end of the LED string 10 and the ground terminal PGND, i.e., on a path of the driving current ILED that flows through the LED string 10. A voltage drop (current detection signal) $V_{IS}$ that is proportional to the driving current ILED occurs at the detection resistor R1.

$$V_{IS} = R1 \times ILED \quad (1)$$

The current detection signal $V_{IS}$ is fed back to the feedback terminal (ILED terminal) of the control unit 30. Also, as necessary, a capacitor C4 may be arranged in parallel with the detection resistor R1. By providing such a capacitor C4, such an arrangement is capable of removing noise in the current detection signal $V_{IS}$.

The control unit 30 receives a PWM dimming signal PDIM (which will be referred as the "PDIM signal" hereafter) via a PWM terminal thereof. The PDIM signal is configured as a signal subjected to pulse width modulation so as to have a duty ratio that corresponds to the target light-emission luminance of the LED string 10. The frequency of the PDIM signal is set to a given value in a range between 100 to 500 Hz.

The control unit 30 performs a feedback control operation for the power supply 20 such that, in an on period Ton in which the PDIM signal is a first level (e.g., high level), the voltage drop across the detection resistor R1, i.e., the current detection signal $V_{IS}$, approaches a reference voltage Vref that is a target value. With the voltage (voltage drop) that occurs between both ends of the LED string 10 as VF, the following Expression holds true.

$$Vout = V_{IS} + VF \quad (2)$$

With the number of LEDs that comprise the LED string 10 as n, VF is represented by the following Expression. Here, Vf represents the forward voltage of each LED.

$$VF = Vf \times n \quad (3)$$

Thus, as a result of the feedback control operation by the control unit 30, the output voltage Vout of the power supply 20 is stabilized so as to satisfy the following Expression.

$$Vout = Vref + VF \quad (4)$$

It should be noted that such a feedback control operation can be realized using known techniques that correspond to the type or the topology of the power supply 20, and accordingly, description thereof will be omitted.

As a result of the feedback control operation, the driving current ILED is stabilized as represented by the following Expression.

$$ILED = Vref / R1 \quad (5)$$

That is to say, by changing the reference voltage Vref, such an arrangement is capable of changing the driving current ILED, thereby controlling the luminance of the LED string 10. Such a method is the aforementioned analog dimming control method.

In an off period Toff in which the PDIM signal is a second level (low level) which differs from the first level (high level), the control unit 30 stops the feedback control operation for the power supply 20. Examples of the operation for stopping the feedback control operation include: an operation for stopping the supply of the control signal to the power supply 20; an operation for fixing the level of the control signal; and an operation for stopping the operation of the power supply 20.

Figure 2:
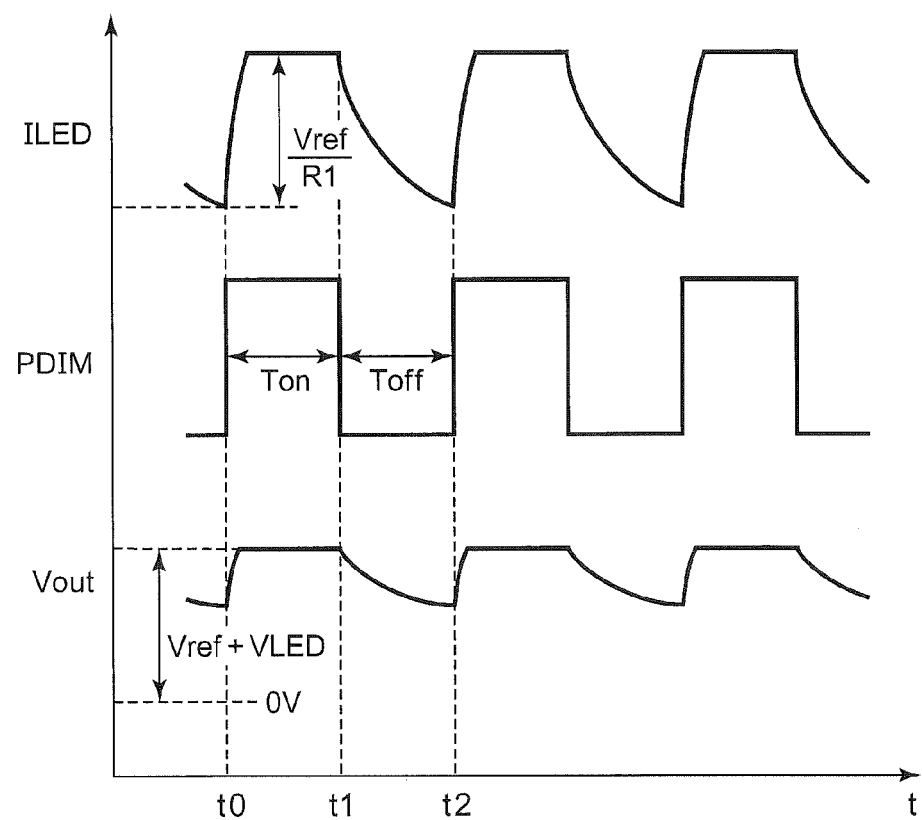
FIG. 2 is a time chart which shows the operation of a backlight shown in FIG. 1.

The above is the configuration of the backlight 8. Next, description will be made regarding the operation thereof. FIG. 2 is a time chart which shows the operation of the backlight 8 shown in FIG. 1.

During the on period Ton from the time point t0 to t1, the output voltage Vout is stabilized so as to satisfy Expression (4), and thus, the driving current ILED is stabilized as represented by Expression (5). When the PDIM signal transits to low level at the time point t1, the period switches to the off period Toff. In this stage, the control operation for the power supply 20 is stopped, and accordingly, the supply of charge to the output capacitor C1 included in the power supply 20 is stopped. As a result, the charge stored in the output capacitor C1 is discharged to the ground terminal PGND via the LED string 10 and the detection resistor R1. Accordingly, the driving voltage Vout gradually falls over time. The time constant that determines the rate at which the driving voltage Vout falls mainly depends on the resistance of the detection resistor R1 and the capacitance of the output capacitor C1.

As the driving voltage Vout becomes lower, the driving current ILED of the LED string 10 gradually becomes lower, which gradually reduces the light-emission luminance.

With the backlight 8 shown in FIG. 1, by controlling the on/off operation of the driving current ILED with an intentionally low responsiveness according to the PDIM signal, instead of controlling the on/off operation with a high responsiveness, such an arrangement suppresses sudden change in the luminance. By gradually changing the luminance of the backlight 8, such an arrangement prevents screen flicker caused by the shutter effect of the liquid crystal panel 4.

With the backlight 8 shown in FIG. 1, the frequency of the PWM dimming control operation can be set independently of the scanning frequency of the liquid crystal panel 4. Thus, such an arrangement is capable of performing a PWM dimming control operation in a relatively low frequency range, on the order of 100 to 500 Hz, which is in the vicinity of the frame rate of the video image. For preventing screen flicker, such an arrangement does not require another approach in which the frequency of the PWM dimming control operation is increased. Thus, such an arrangement relaxes the design constraints imposed on other circuit blocks.

As described above, the rate at which the driving voltage Vout falls can be adjusted according to the capacitance of the output capacitor C1 and the resistance of the detection resistor R1. Thus, the waveform of the driving current ILED can be adjusted using a combination of C1 and R1.

Figure 3:
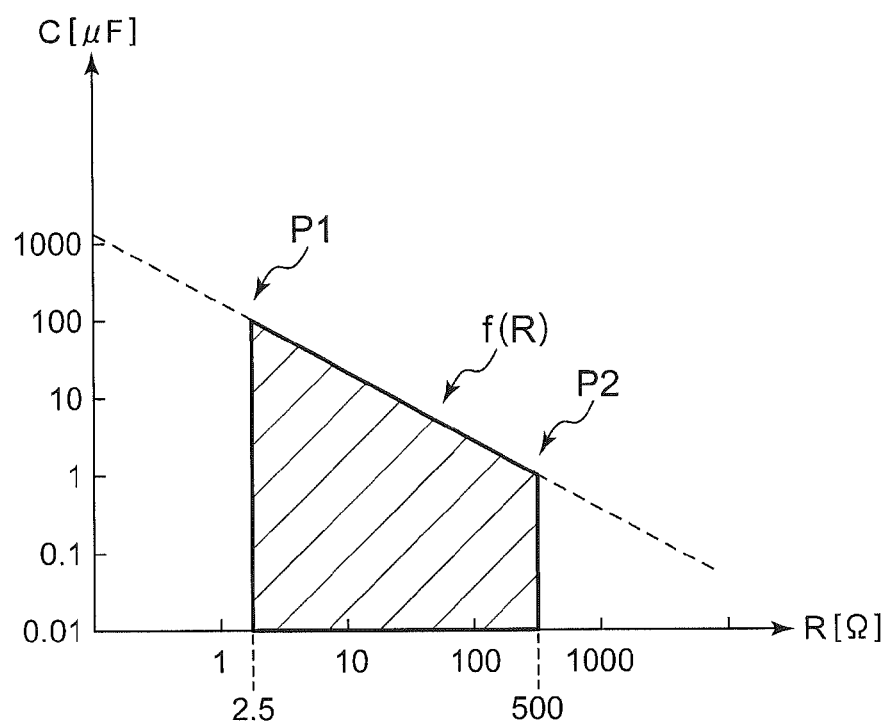
FIG. 3 is a graph which shows a suitable range of the capacitance of an output capacitor and the resistance of a detection resistor.

FIG. 3 is a graph showing a suitable range of such a combination of the capacitance of the output capacitor C1 and the resistance of the detection resistor R1. FIG. 3 is a double logarithmic graph where the vertical axis represents the capacitance, and the horizontal axis represents the resistance. In FIG. 3, the hatched region represents a range in which screen flicker can be suitably prevented.

In FIG. 3, a first coordinate point P1 and a second coordinate point P2 are plotted, and a function f(R) represented by a curve that connects these two points is shown. The first coordinate point is a coordinate point that represents a combination of R=2.5Ω and C=100 μF. The second coordinate point is a coordinate point that represents a combination of R=500Ω and C=1 μF.

Referring to FIG. 3, the suitable ranges of the resistance and the capacitance are obtained as represented by the following Expressions.

$$2.5\Omega \leq R \leq 500\Omega \quad (6)$$

$$0.01 \, \mu F \leq C \leq f(R) \quad (7)$$

By determining the resistance value and the capacitance value so as to satisfy the inequality expressions (6) and (7), such an arrangement is capable of appropriately preventing screen flicker.

Figure 4:
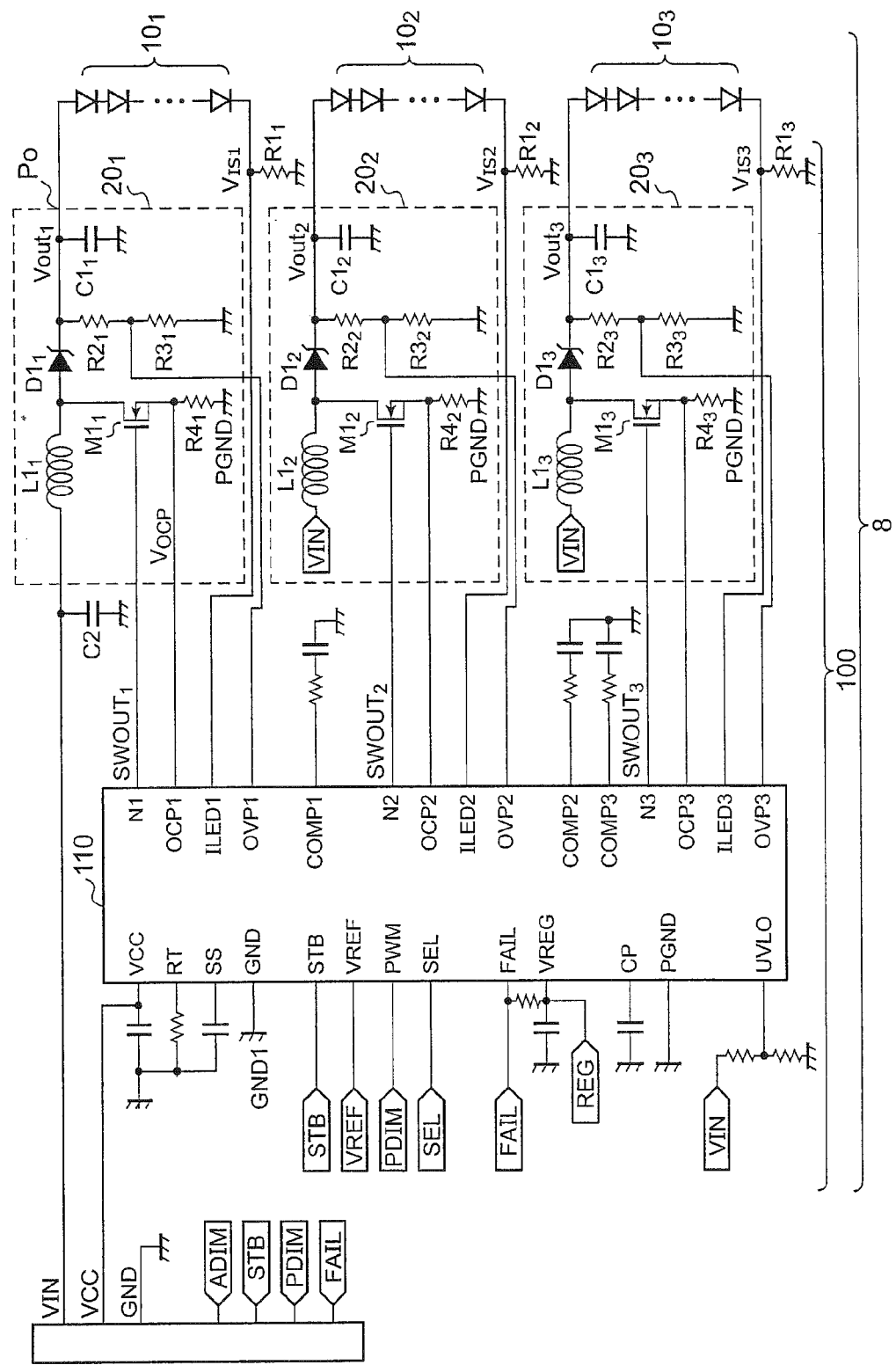
FIG. 4 is a block diagram which shows a detailed example configuration of a backlight according to an embodiment.

Next, description will be made regarding a specific circuit configuration of the backlight 8. FIG. 4 is a block diagram which shows a detailed example configuration of the backlight 8 according to the embodiment. FIG. 4 shows an arrangement including three channels of LED strings 10. The index appended to each reference numeral, which indicates the corresponding component, represents the channel to which the component belongs. It should be noted that the number of channels is not restricted to 3. Also, the number of channels may be set to a desired number.

The LED driving circuit 100 includes multiple power supplies $20_1$ through $20_3$, and multiple detection resistors $R1_1$ through $R1_3$, for the respective channels. The LED driving circuit 100 further includes an LED control IC 110. Each channel has the same configuration. The control unit 30 shown in FIG. 1 configured to control each respective channel can be regarded as a comprehensive representation of the LED control IC 110. Directing attention to the first channel, description will be made regarding the configuration of the LED driving circuit 100.

The LED driving circuit 100 receives an input voltage Vin, a power supply voltage Vcc, and a ground voltage GND. The power supply voltage Vcc may be the same as the input voltage Vin. The input capacitor C2 smoothes the input voltage Vin.

The power supply $20_1$ supplies a driving voltage $Vout_1$ to a first end of the corresponding LED string $10_1$. The power supply $20_1$ includes an output capacitor $C1_1$ between an output terminal Po thereof and a fixed voltage terminal (ground terminal). As described above, the configuration of the power supply $20_1$ is not restricted in particular. For example, a switching regulator as shown in FIG. 4 is suitably employed.

The switching regulator $20_1$ mainly includes an inductor L1, a switching element M1, an output diode D1, and an output capacitor C1. The switching regulator $20_1$ is configured as a known circuit, and accordingly, detailed description thereof will be omitted. By switching the switching element M1, such an arrangement boosts the input voltage Vin, thereby generating a driving voltage $Vout_1$.

The driving voltage $Vout_1$ is divided by the dividing resistors $R2_1$ and $R3_1$, and is input to an overvoltage protection terminal OVP1 of the LED control IC 110.

The detection resistor $R1_1$ is arranged between a second end of the corresponding LED string $10_1$ and a fixed voltage terminal (ground terminal), i.e., on a path of a driving current $ILED_1$ that flows through the LED string $10_1$. The detection voltage $V_{IS1}$ is fed back to the current detection terminal $ILED_1$ of the LED control IC 110.

A detection resistor R4 is arranged between the source of the switching element M1 and the ground terminal PGND. A voltage drop Vocp, which is proportional to the current that flows through the switching element M1, occurs at the detection resistor R4. The voltage Vocp is input to an overcurrent protection terminal OCP1 of the LED control IC 110.

A switching output terminal N1 of the LED control IC 110 is connected to the gate of the switching element $M1_1$ of the corresponding power supply $20_1$. The LED control IC 110 supplies a switching signal $SWOUT_1$ to the gate of the switching element $M1_1$ so as to perform switching of the switching element M1. Such a switching operation controls the boosting operation of the power supply 20, thereby adjusting the driving voltage Vout.

Figure 5:
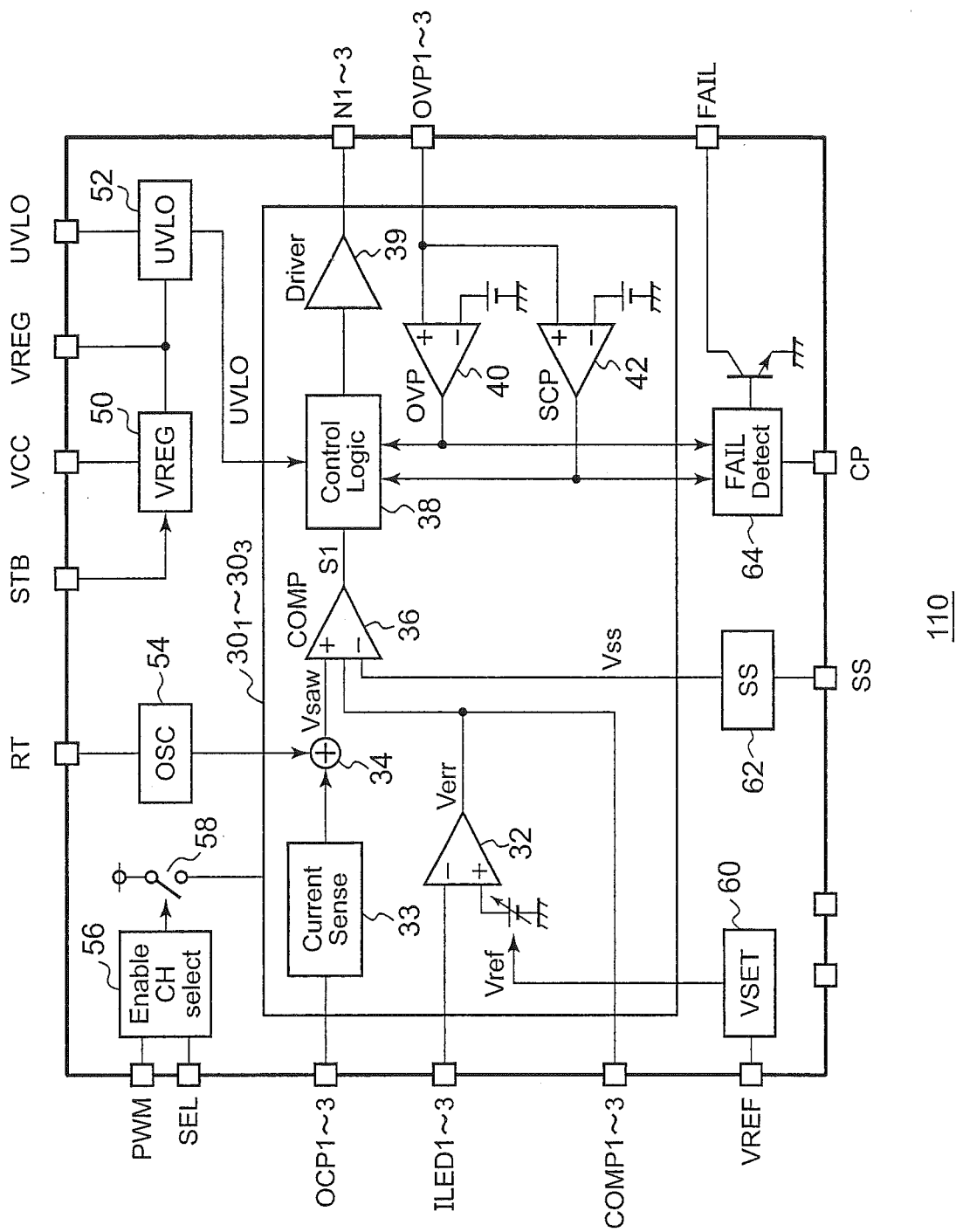
FIG. 5 is a block diagram which shows an example configuration of an LED control IC shown in FIG. 4.

FIG. 5 is a block diagram which shows an example configuration of the LED control IC 110 shown in FIG. 4. FIG. 5 shows a single control unit 30 that collectively represents the respective channels of the control units 30. In actuality, the control units 30 are arranged separately for the respective channels.

The power supply voltage VCC is supplied to a reference voltage generating unit 50 from an external circuit. The power supply voltage VCC is on the order of 7 to 15 V. When a standby signal STB input to the standby terminal STB is asserted, the reference voltage generating unit 50 is started up, and generates a reference voltage VREG. The reference voltage VREG thus generated is supplied to each block included in the LED control IC 110, and is output to an external circuit via a VREG terminal.

A UVLO (UnderVoltage LockOut) terminal receives, as an input signal, the input voltage Vin divided by an external resistor. A UVLO circuit 52 monitors the electric potential at the UVLO terminal. When the input voltage Vin is low, the UVLO circuit 52 asserts the UVLO signal. The UVLO signal is input to the control unit 30.

An oscillator 54 oscillates at a predetermined frequency so as to generate a cyclic signal. The frequency of the cyclic signal thus generated is adjustable using a resistor provided as an external component to an RT terminal. The frequency corresponds to the switching frequency of the switching element M1 of the switching regulator, which is set to be on the order of 300 kHz to 1 MHz, for example.

The multiple channels are configured to be independently switchable between an enable state and a disable state. A channel select circuit 56 selects a channel that is to be set to the enable state based upon a select signal input to a select terminal SEL. The channel select circuit 56 receives, as an input signal, a particular logical signal that corresponds to the liquid crystal panel. Based upon the logical settings, such an arrangement is capable of turning on only the necessary LED strings. A switch 58 switches to being conductive with respect to the control unit of the channel thus set to the enable state, thereby supplying the power supply voltage to the control unit 30 of the enabled channel. The channel select circuit 56 receives, as an input signal, the PDIM signal input to the PWM terminal. According to the PDIM signal, the channel select circuit 56 performs switching of each switch 58 that corresponds to an enabled channel. As a result, the channel select circuit 56 alternately repeats switching the state of the enabled channel, which has been enabled according to the select signal SEL, between an active state and an inactive state.

An overvoltage detection comparator 40 compares the voltage at an overvoltage protection terminal OVP with a predetermined threshold voltage, and judges whether or not the output voltage Vout of the power supply 20 is in an overvoltage state. A short-circuit detection comparator 42 compares the voltage at the overvoltage protection terminal OVP with a predetermined threshold voltage, and judges whether or not the output terminal Po of the power supply 20 or the first end of the LED string 10 is in a short-circuit state. The signals that represent the judgment results obtained by the overvoltage detection comparator 40 and the short-circuit detection comparator 42 are input to a fail detection circuit 64 and a control logic unit 38.

The fail detection circuit 64 receives the signals from the overvoltage detection comparator 40 and the short-circuit detection comparator 42. The fail detection circuit 64 outputs a fail signal FAIL to an external circuit, which is asserted when judgment is made that an abnormal state has occurred. Furthermore, when such an abnormal state is detected by the overvoltage detection comparator 40 or the short-circuit detection comparator 42, the control logic unit 38 stops the switching operation of the switching element M1.

A current detection unit 33 receives the signal Vocp input to the OCP terminal, and monitors the signal Vocp thus received such that the coil current that flows through the inductor L1 does not exceed a predetermined value. A cyclic signal generating unit 34 generates a cyclic signal Vsaw having a sawtooth waveform or a triangular waveform based upon a cyclic signal received from the oscillator 54 and a signal received from the current detection unit 33.

A reference voltage adjustment unit 60 receives an analog dimming reference voltage VREF from an external circuit, and generates a reference voltage Vref. An error amplifier 32 amplifies the difference between the reference voltage Vref and the detection voltage $V_{IS}$ fed back to the ILED terminal so as to generate an error signal Verr. A soft start circuit 62 generates a soft start voltage Vss which gradually rises in the startup operation. A PWM comparator 36 compares the lower of the error signal Verr and the soft start signal Vss with the cyclic signal Vsaw output from the cyclic signal generating unit 34. The PWM comparator 36 outputs a PWM signal S1 subjected to pulse width modulation. The control logic unit 38 outputs the PWM signal S1 thus subjected to pulse width modulation to a driver 39. According to the PWM signal S1, the driver 39 drives the switching element M1 connected to the switching output terminal.

Figure 6:
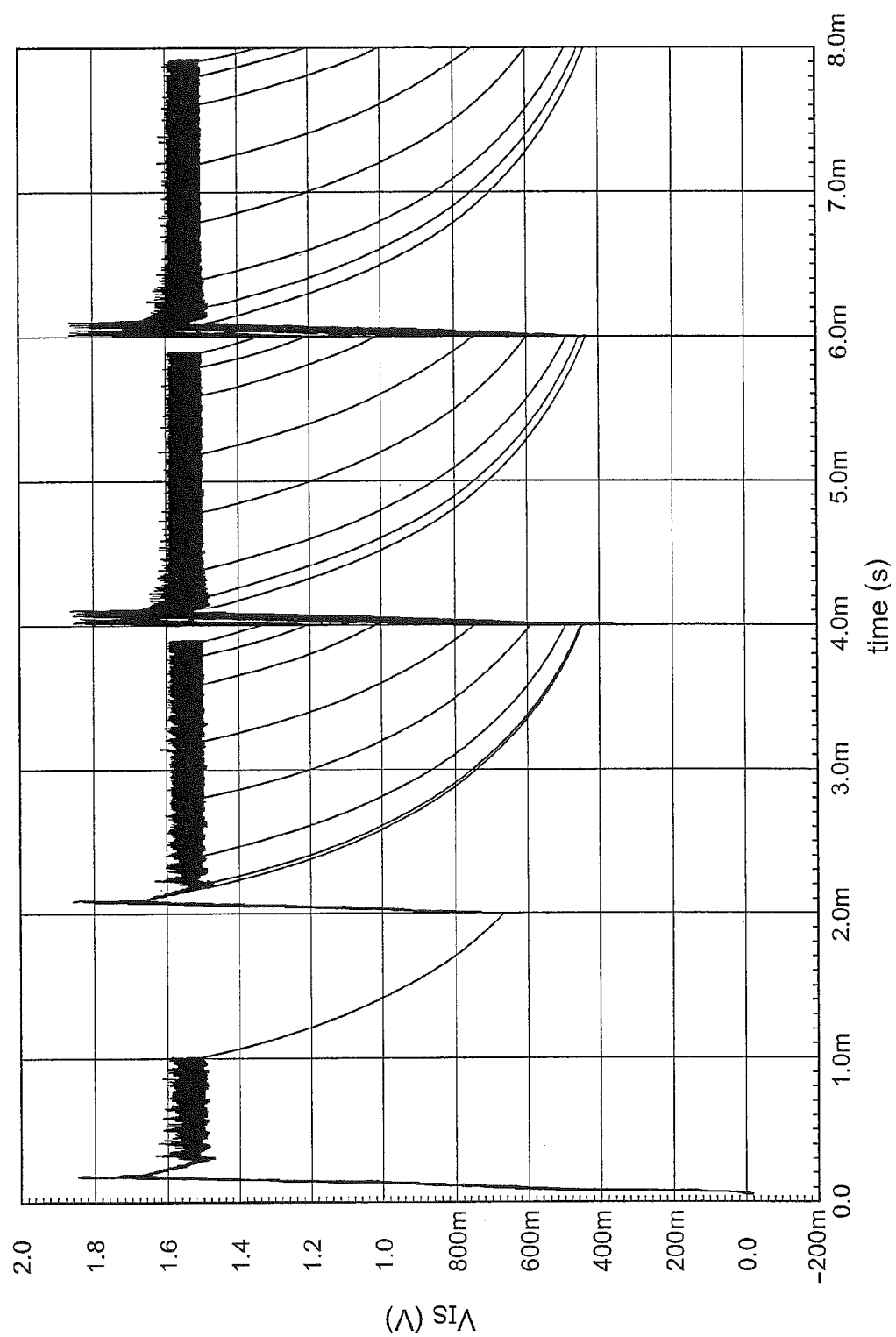
FIG. 6 shows operating waveforms representing the operation of the backlight shown in FIG. 4.

The above is the detailed configuration of the LED control IC 110. Next, description will be made regarding the operation thereof. FIG. 6 is a waveform diagram which shows the operation of the backlight 8 shown in FIG. 4. FIG. 6 shows an operating waveform where C1=2.2 µF, R1=25Ω, L1=22 µH, and an $I_{LED}$=60 mA (peak value). The frequency of the PDIM signal is 500 Hz (i.e., the period is 2 ms). FIG. 6 shows the waveforms in a case in which PDIM signals having different duty ratios are supplied.

Directing attention to the enabled channel, description will be made below. The PDIM signal alternately repeats switching between high level and low level with a duty ratio that corresponds to the luminance. Accordingly, the power supply voltage is intermittently supplied to the control unit 30 of the enabled channel. During a period in which the power supply voltage is supplied in the on period Ton, the control unit 30 stabilizes the output voltage Vout of the corresponding power supply 20 so as to satisfy Expression (4), and performs an analog dimming control operation on the driving current ILED so as to satisfy Expression (5).

In the off period Toff in which the power supply voltage is not supplied, such an arrangement disables the operation by the control unit 30 for switching the switching element M1, and accordingly, the feedback control operation for the power supply 20 enters the stopped state.

Referring to FIG. 6, after the time point t=2.0 ms, the PWM dimming control operation is started according to the PDIM signal. After the time point t=4.0 ms, a sufficient driving voltage Vout is generated by means of the power supply 20. In this state, it can be understood that the period in which the driving current ILED ($V_{IS}$) flows is changed according to the duty ratio of the PDIM signal, and the luminance of the LED string 10 is changed according to the duty ratio of the PDIM signal.

The driving current ILED has a waveform with a trailing edge (negative edge) having a gentle slope, regardless of the duty ratio. Thus, such an arrangement appropriately prevents screen flicker.

Figure 7:
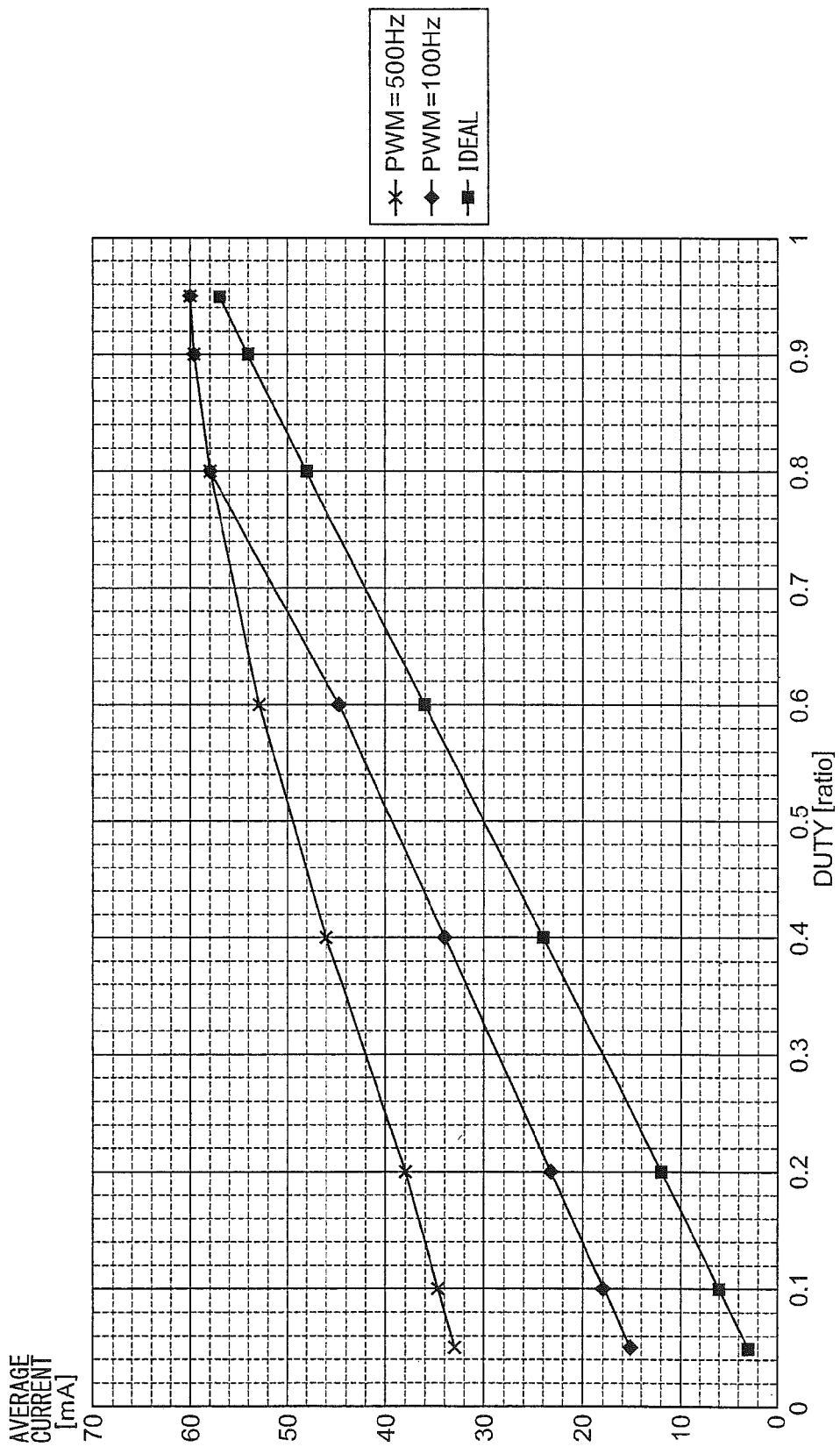
FIG. 7 is a graph which shows the relation between the duty ratio of the PDIM signal and the driving current averaged for each cycle.

FIG. 7 is a graph which shows the relation between the duty ratio of the PDIM signal and the driving current ILED averaged for each cycle in the backlight 8 shown in FIG. 4. FIG. 7 shows the relations in a case in which the frequency of the PDIM signal is 500 Hz, and in a case in which the frequency is 100 Hz. In a case in which the driving current ILED has a steep switching waveform that has not been dulled (i.e., an ideal switching waveform), the average of the driving current ILED is proportional to the duty ratio of the PDIM signal. In contrast, with such a backlight 8 shown in FIG. 4, the driving current ILED has a dulled waveform. Accordingly, such an arrangement provides a different relation between the average driving current ILED and the duty ratio than in the case of a steep waveform. Furthermore, such an arrangement provides a different relation for each frequency of the PDIM signal. Thus, such an arrangement is capable of performing a dimming control operation according to the frequency of the PDIM signal, in addition to the duty ratio of the PDIM signal. Such a relation between the PDIM signal and the average current shown in FIG. 7 can be acquired beforehand. Thus, the designer of the backlight 8 should adjust the duty ratio of the PDIM signal based upon the relation as shown in FIG. 7.

Figure 8:
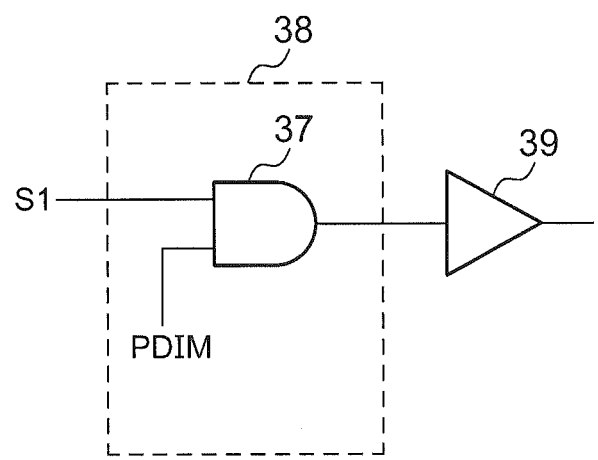
FIG. 8 is a circuit diagram which shows a part of a control unit according to a modification.

FIG. 8 is a circuit diagram which shows a part of a control unit according to a modification. A control unit 30a shown in FIG. 8 includes a mask circuit 37 configured to mask the PWM signal S1 using the PDIM signal. In a simplest configuration, such a mask circuit 37 can be configured as an AND gate. With such a control unit 30a shown in FIG. 8, such an arrangement is capable of stopping the switching operation of the switching element M1 in the off period Toff in which the PDIM signal is low level.

[Second embodiment]

Figure 9:
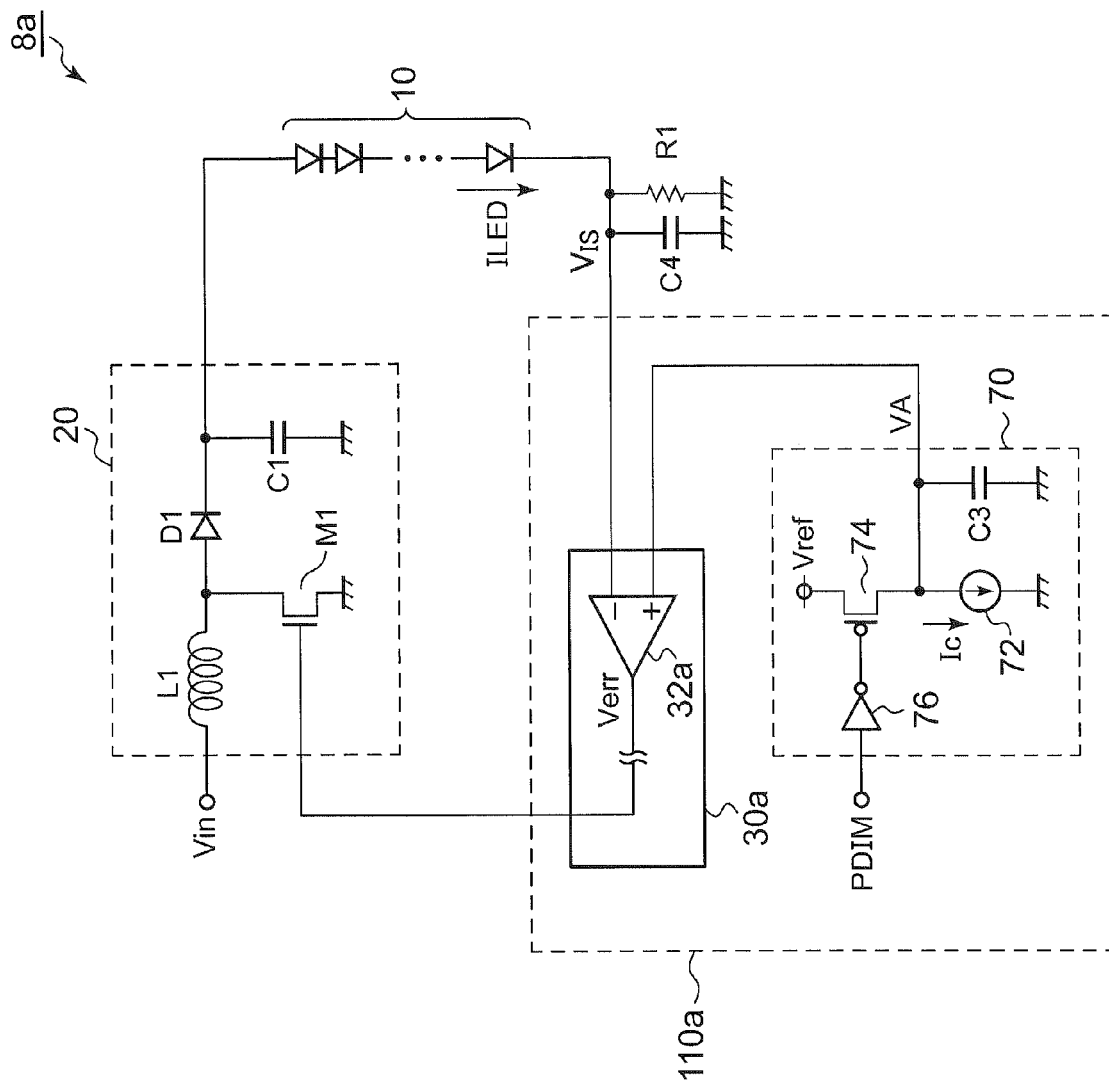
FIG. 9 is a block diagram which shows a configuration of a backlight according to a second embodiment.

FIG. 9 is a block diagram which shows a configuration of the backlight 8 according to a second embodiment. Description has been made in the first embodiment regarding an arrangement in which the waveform of the driving current ILED is dulled by means of discharging the output capacitor C1. In contrast, with the second embodiment, the driving current ILED (current detection signal $V_{IS}$) is directly controlled.

An LED control IC 110a includes a pattern signal generating circuit 70 and a control unit 30a. The pattern signal generating circuit 70 receives a PDIM signal having a duty ratio that corresponds to the luminance. The pattern signal generating circuit 70 generates a reference voltage VA that transits to a first target value with a first slope upon receiving one kind of edge, i.e., either the positive edge or the negative edge, of the PDIM signal, and that transits to a second target value with a second slope upon receiving the other kind of edge. For example, upon receiving a positive edge of the PDIM signal, the reference voltage VA rises with a first slope (rate), and upon receiving a negative edge of the PDIM signal, the reference voltage VA falls with a second slope.

The pattern signal generating circuit 70 includes a capacitor C3, a discharge circuit 72, a charging circuit 74, and an inverter 76. The capacitor C3 is arranged such that the first end thereof is grounded such that it is set to a fixed electric potential. The discharge circuit 72 is configured as a current source, for example, which is configured to draw a constant current Ic from the capacitor C3 so as to discharge the capacitor C3. A resistor may be employed instead of such a current source. The charging circuit 74 is configured as a transistor switch, for example. The charging circuit 74 is arranged such that its one end is connected to the capacitor C3, and a predetermined bias voltage Vb is applied to the other end. The bias voltage Vb is a voltage that corresponds to the reference voltage Vref shown in FIG. 5. When the charging circuit 74 is turned on, the capacitor C3 is charged. Instead of such a transistor switch, a current source may be employed as the charging circuit 74. The inverter 76 inverts the PDIM signal so as to switch the charging circuit 74 on and off. The voltage that develops at the capacitor C3 is output as the reference voltage VA.

An error amplifier 32a included in the control unit 30a amplifies the difference between the reference voltage VA and the current detection signal $V_{IS}$. The components downstream of the error amplifier 32a can be configured in the same way as shown in FIG. 5, and accordingly, description thereof will be omitted. Alternatively, the switching element M1 may be controlled using a method that differs from that shown in FIG. 5. That is to say, the control unit 30a controls the power supply 20 such that the voltage drop $V_{IS}$ across the detection resistor R1 approaches the reference voltage VA.

Figure 10:
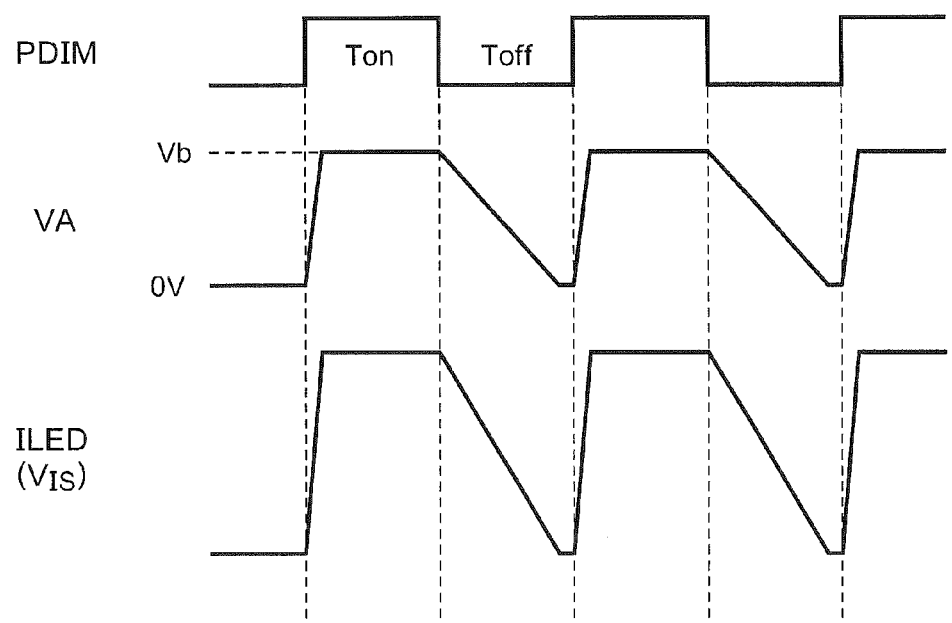
FIG. 10 is a time chart which shows the operation of the backlight shown in FIG. 9.

Next, description will be made regarding the operation of the backlight 8a shown in FIG. 9. FIG. 10 is a time chart which shows the operation of the backlight 8a shown in FIG. 9. When the PDIM signal is high level (the on period Ton), the charging circuit 74 is turned on. In this state, the capacitor C3 is charged with the first slope, following which the reference voltage VA becomes equal to the bias voltage Vb. When the PDIM signal becomes low level (the off period Toff), the charging circuit 74 is turned off. In this state, the charge stored in the capacitor C3 is discharged via the current Ic generated by the discharge circuit 72, and accordingly, the reference voltage VA falls with the second slope toward the ground voltage 0 V.

The first slope can be adjusted by adjusting the performance (on resistance) of the charging circuit 74. The second slope can be adjusted by adjusting the performance (current value Ic) of the discharge circuit 72.

The pattern signal generating circuit 70 generates the reference voltage VA, which rapidly rises when a positive edge of the PDIM signal is received, and which gradually falls according to the current value Ic when a negative edge of the PDIM signal is received. Furthermore, the control unit 30 performs a feedback control operation such that the waveform of the driving current ILED follows the reference voltage VA.

With such a backlight 8a according to the second embodiment, screen flicker can be reduced in the same way as with the backlight 8 according to the first embodiment.

Description has been made regarding the present invention with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Description has been made in the first and second embodiments regarding an arrangement configured to dull the trailing edge of the driving current ILED for the LED string 10. Conversely, an arrangement may be made configured to dull the leading edge of the driving current ILED. Alternatively, an arrangement may be made configured to dull both the leading edge and the trailing edge of the driving current ILED. With the first embodiment, the trailing edge can be dulled using a simple configuration. With the second embodiment, the slopes of both the leading edge and the trailing edge can be adjusted independently. Also, an arrangement may be made according to a combination of the first embodiment and the second embodiment.

With a comprehensive assessment of the LED driving circuits 100 disclosed in the first embodiment and the second embodiment, the following technical idea is introduced. That is to say, with a duty ratio that corresponds to the luminance, the LED driving circuit 100 performs switching of the current ILED that flows through the LED string 10. Furthermore, in the switching operation, such an arrangement dulls at least one of the positive edge (leading edge) or the negative edge (trailing edge) of the waveform of the driving current ILED that flows through the LED string 10. Thus, such an arrangement is capable of reducing screen flicker.

Description has been made regarding the present invention with reference to the embodiments. However, it is needless to say that the above-described embodiments show only the mechanisms and applications of the present invention for exemplary purposes only, and are by no means intended to be interpreted restrictively. Rather, various modifications and various changes in the layout can be made without departing from the spirit and scope of the present invention defined in appended claims.

The invention claimed is:

1. A driving circuit configured to drive a display backlight LED string comprising a plurality of LEDs connected in series, the driving circuit comprising:

a power supply configured to supply a driving voltage from an output terminal thereof to a first end of the LED string, and comprising an output capacitor arranged between an output terminal thereof and a fixed voltage terminal;

a detection resistor arranged between a second end of the LED string and a fixed voltage terminal; and a control unit configured to receive a pulse modulation signal having a duty ratio that corresponds to a luminance, to control the power supply in an on period in which the pulse modulation signal is a first level such that the voltage drop across the detection resistor approaches a predetermined target value, and to stop the control operation for the power supply in an off period in which the pulse modulation signal is a second level that differs from the first level.

2. A driving circuit according to claim 1, wherein the power supply is configured as a switching regulator comprising a switching element, and wherein the control unit is configured to stop a switching operation of the switching element in the off period.

3. A driving circuit according to claim 2, wherein the capacitance C of the output capacitor and the resistance value R of the detection resistor are determined so as to satisfy a relation $2.5\Omega \leq R \leq 500\Omega$ and $0.01\ \mu F \leq V \leq f(R)$, and wherein the line that represents the aforementioned function f(R) passes through a coordinate point (R=2.5Ω and C=100 μF) and a coordinate point (R=500Ω and C=1 μF) when plotted on a double logarithmic graph where the vertical axis represents the capacitance value C, and where the horizontal axis represents the resistance value R.

4. A driving circuit according to claim 1, wherein the power supply is configured as a switching regulator comprising a switching element, and wherein the control unit is configured to stop a switching operation of the switching element in an off period in which the pulse modulation signal is an instruction to turn off the LED string.

5. A driving circuit according to claim 4, wherein the control unit comprises:

a comparator configured to generate a switching signal having a duty ratio adjusted such that a voltage drop across the detection resistor approaches the reference voltage; and a mask circuit configured to mask the switching signal using the pulse modulation signal, wherein the control unit performs switching of the switching element according to an output signal of the mask circuit.

6. A backlight apparatus comprising:

a display backlight LED string comprising a plurality of LEDs connected in series; and a driving circuit according to claim 1, configured to drive the LED string.

7. A driving circuit configured to drive a display backlight LED string comprising a plurality of LEDs connected in series, the driving circuit comprising:

a power supply configured to supply a driving voltage from an output terminal thereof to a first end of the LED string, and comprising an output capacitor arranged between an output terminal thereof and a fixed voltage terminal;

a detection resistor arranged between a second end of the LED string and a fixed voltage terminal;

a pattern signal generating unit configured to receive a pulse modulation signal having a duty ratio that corresponds to a luminance, and to generate a reference voltage which transits to a first target value with a first slope upon receiving one of a positive edge or a negative edge of the pulse modulation signal, and which transits to a second target value with a second slope upon receiving the other edge of the pulse modulation signal; and a control unit configured to control the power supply such that a voltage drop across the detection resistor approaches the reference voltage.

8. A driving circuit according to claim 7, wherein the pattern signal generating unit comprises:

a capacitor arranged such that one end thereof is set to a fixed electric potential;

a charging circuit configured to charge the capacitor at a rate that corresponds to the first slope;

a discharge circuit configured to discharge the capacitor at a rate that corresponds to the second slope; and a control unit configured to control the charging operation of the charging circuit and the discharging operation of the discharge circuit according to the pulse modulation signal, wherein the pattern signal generating unit is configured to output, as the reference voltage, the voltage that develops at the capacitor.

9. A driving circuit configured to drive a display backlight LED string comprising a plurality of LEDs connected in series, the driving circuit comprising a switching unit configured to perform switching of a current that flows through the LED string with a duty ratio that corresponds to a luminance, wherein the switching unit is configured to dull at least one from among a positive edge and a negative edge of the waveform of a driving current that flows through the LED string.

10. A display apparatus comprising:

a liquid crystal display panel; and a backlight apparatus according to claim 9, comprising the LED string arranged on the back face of the liquid crystal display panel.

11. A method for driving a display backlight LED string comprising a plurality of LEDs connected in series, the method comprising switching of a current that flows through the LED string with a duty ratio that corresponds to a luminance, wherein, in the switching operation, at least one from among a positive edge and a negative edge of the waveform of a driving current that flows through the LED string is dulled.

* * * * *